CONTINUOUS SCANNING APPARATUS

Filed May 28, 1959 2 Sheets-Sheet 1

INVENTOR.
Gerald G. Murphy
BY

CONTINUOUS SCANNING APPARATUS

Filed May 28, 1959 2 Sheets-Sheet 2

INVENTOR.
Gerald G. Murphy
BY 3,121,138

CONTINUOUS SCANNING APPARATUS

Gerald G. Murphy, 153 Rock Hill Road, Clifton, N.J.
Filed May 28, 1959, Ser. No. 816,500
17 Claims. (Cl. 178—5.2)

The present invention relates to apparatus intended primarily for deriving graphic signal impulses from an original subject copy or informational source and reproducing the resultant informational content in graphic form, such as is accomplished in facsimile apparatus, various writing recorders and the like. It involves a type of scanning apparatus, capable of deriving graphic or picture signals, in association with a type of recording apparatus capable of being activated by appropriate electrical, mechanical or other type signal impulses to effect a graphic recording of corresponding signal information upon a recording sheet in a systematic and time-sequential manner.

One object of the present invention is to effect so-called continuous scanning of a subject copy sheet with simple and efficient optical means.

Another object is to provide means for derivation of graphic signals which may relate to subject copy information of either a monochrome character or of a multicolor character, depending upon particular apparatus means adopted.

Another object is to provide means for graphic recording of a so-called continuous type upon a record sheet which may be either opaque, translucent or transparent.

Another object is to provide means for recording on the record sheet which includes a set of signal-activated writing units which are made to move with respect to the record sheet in an orderly and systematic manner.

Another object is to provide recording means wherein the writing units write or mark with appropriate types of ink or of transferrable film upon the record sheet when the writing units are suitably activated.

Another object is to provide recording means wherein either monochrome or multi-colored marking may be effected on the record sheet in accordance with corresponding monochrome or multi-colored graphic signals received from an associated graphic scanner or signal transmitting apparatus properly related thereto.

These and other objects of the invention will be apparent from the detailed description thereof given in connection with the various figures of the drawing.

The present invention apparatus is applicable to facsimile systems as one general usage thereof. In addition, other systems which may derive informational impulses in electrical, mechanical, hydraulic or other form of actuating force or energy from control, monitoring, measuring devices or the like may employ apparatus according to the invention to achieve a graphic record of these impulses capable of interpretation according to appropriate standards.

In construction of graphic scanning and recording apparatus problems often appear in accomplishing a simple and economical means for so-called continuous scanning of the subject copy, and particularly in achieving an economical method of reproducing multi-colored subject information graphically in proper relation to the original. Difficulties have been encountered in achieving direct ink or transfer film marking with good and consistent definition upon a continuous record sheet. Recording media, such as electrolytic paper, dry coated conductive paper and heavy carbon paper, have presented problems of either storage, handling, chemical effects and odors, dimensional stability or economy, and they have not provided for multi-colored recording in a single apparatus and operating sequence.

The present invention surmounts these difficulties by providing a correlation of operating principles related to the movement of a set of scanning elements in the scanning apparatus as compared to the movement of a set of corresponding writing elements in the recording apparatus, and in providing for recording with one or more inks or transfer films upon an ordinary type dry recording sheet material.

The scanning apparatus as herein described employs a modification of means but utilizing the same operating principles as specified in my copending patent application No. 758,143 on Facsimile Apparatus, now abandoned, to which reference is duly made. A series of moving scanning tubes, which are provided with lens and light restricting means, are carried on one or more endless tapes and are arranged to pass repetitively near the subject copy surface in a systematic manner and thereby define a series of scanning spots along successive scanning lines of the copy. The copy, which may be of continuous or random length, is moved progressively past the active scanning range of the scanning tubes. Light from the successively defined scanning spots passes through the scanning tubes into a compartment, which substantially excludes extraneous light, whereupon it is concentrated by a light-collecting reflector onto the photosensitive surface of a photomultiplier, or equivalent element, which is connected into an appropriate electrical circuit. The reflector is preferably a section of paraboloidal or parabolic form in order to concentrate scanning light beams from anywhere along an extended scanning range onto a small area which may be the photomultiplier window or a fixed aperture related thereto. Where color picture signals are to be developed various colored light filters are applied individually to respective ones of the moving scanning tubes to provide in each a color discrimination to the scanning spot light beam passing therethrough and on to the photosensitive element. Other scanning tubes of the total set may be provided without colored light filters in order to gauge total light from or "whiteness" of the subject copy.

The recording apparatus utilizes a so-called continuous record sheet with appropriate carrying and feed means, a set of signal-activated marking or writing units which include writing pens or plungers therein, and a variety of colored inks or, alternatively, a variety of colors of transfer film, inked ribbon, sheet or the like, supplied respectively to various of the writing pens or plungers at appropriate times for recording. The record sheet may be transparent, translucent or opaque and of various colors according to the end result desired and may be of very economical material. The writing units are carried repetitively past the record sheet and adjacent thereto at the recording line by an endless tape or belt which is driven in a predetermined manner in relation to the associated scanning apparatus or transmitting device in the system. The writing actuator means, which may be of electromagnetic, mechanical or other design, controls the motions of the writing pens or plungers in accordance with the required picture or intelligence signals to be reproduced graphically. The intelligence signals may be in electrical, mechanical or other energy transfer form and may be received from any appropriate transmitting apparatus. The writing pens are formed for good marking definition and are arranged to provide smooth rolling or sliding contact with the record sheet or with the transfer ribbon or sheet during the instants of writing. The record sheet, preferably supplied from a long or continuous roll, is fed at a predetermined rate past the path of the writing pens at the recording line, the sheet maintaining a surface smoothness and yet a marked radius of curvature along this line to aid in achieving excellent writing definition. With multi-colored recording, a different color of ink or of transfer film area is supplied to respective ones of the set of writing pens or plungers, the writing of each color being synchronized with respective color signals received from the associated scanning or transmitting apparatus in the system. The multi-colored recording results may be varied widely by the use of variously colored record sheet material, whether of uniform or non-uniform area or pattern, in conjunction with a variety of writing ink or transfer film colors to effect many recorded color combinations. Of course, with single color writing, for example black writing on white or light-colored record sheet, all writing pens or plungers are supplied with the single black writing color in ink or transfer film, as the case may be.

While the drawing illustrates a few possible arrangements and combinations of the various elements and means of the present invention, the views are intended to be in no way restrictive of the details of arrangement or of the possible combinations of these elements and means that may be employed within the scope and spirit of the invention. In the drawing certain details pertaining to possible signal transmitting or signal receiving apparatus which may include mechanical, electrical or circuit elements as well as details of construction such as bearings, shafts, covers, mounting or aligning means or the like, have been omitted since they ae believed understood by those skilled in the art.

The invention, which is clearly capable of further modifications of the elements and means disclosed, will be fully understood by reference to the following detailed description in conjunction with the drawing wherein.

Figure 1:
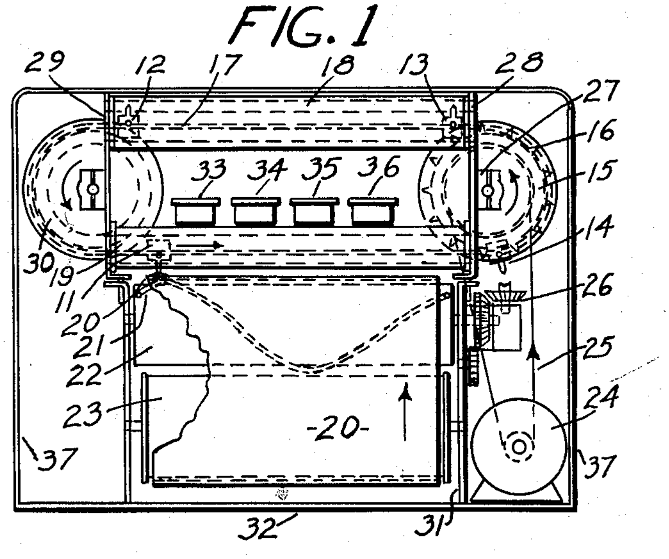
FIG. 1 shows in front projection view, with certain covers removed, a general embodiment of the principles involved in the recording apparatus.
Figure 2:
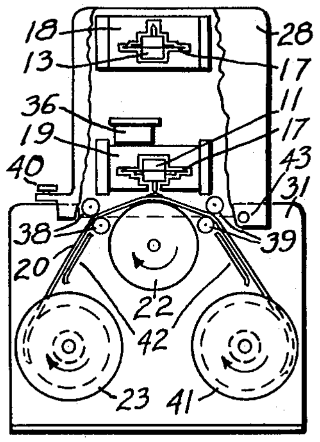
FIG. 2 shows a right orthographic view of the assembly of FIG. 1 with the right hand or drive compartment removed and a structural mounting plate cut away to reveal relations between various internal elements.
Figure 3:
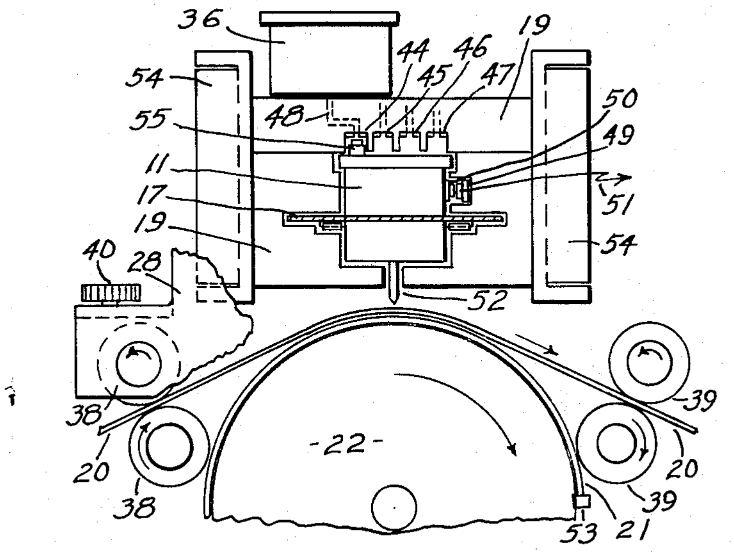
FIG. 3 shows in detail a partial view of FIG. 2.

Referring to FIGS. 1, 2 and 3, a set of writing actuator units 11, 12, 13 and 14, each including thereon a writing plunger or pen 52, are mounted at specified intervals along an endless carrying belt or tape 17 which passes in endwise translation through channel guides 18 and 19 and around driving pulley 15 as well as around driven or idler pulley 30. Pulley 15 may have sprocket teeth 16 properly spaced thereon, or other suitable means, to positively engage and drive tape 17. Pulley 15 is driven, normally at a uniform rotational speed, by a primary drive means such as motor 24, connected through a sprocket chain or toothed belt 25, or the like, together with necessary sprocket or pulley wheels, to provide a non-sliping drive therebetween. Bearing blocks 27 mount pulleys 15 and 30 by their respective center shafts to respectively associated structural mount plates 28 and 29 with suitable provision for alignment and adjustment thereof to obtain proper tension and position of tape 17. Plates 28 and 29 also support guides 18 and 19 in proper related alignment to permit the tape to readily pass therethrough.

Record sheet 20, shown partially cut away to reveal details underneath, is preferably thin and flexible and may be a smooth surface writing paper, plastic film or other material which will accept ink or transfer film marking. Sheet 20 is normally supplied in uniform width and in so-called continuous lengths or rolls on drum 23 from whence it is fed up to and over helix drum 22 adjacent to the paths of the recording tips of the writing pens 52, carried on the successive writing actuator units, during their active writing interval along the recording line while passing through guide 19. The record sheet passes from drum 23 over a guide plate 42, between friction or idler rollers 38, over drum 22, between feed or drive rollers 39, over a second guide plate 42 and around the recorded copy take-up drum 41. Drum 41 is employed for convenience and may be omitted from the apparatus, particularly where provision is made to take the completed recording directly therefrom by a suitable tear-off or cut-off means (not shown) which may be readily applied immediately following feed rollers 39. Drum 22 carries on its cylindrical surface a helical ridge 21 which rises slightly above this surface and extends along the drum in a helical path of substantially uniform pitch for normally an integral number of revolutions about the circumference thereof. Ridge 21 is preferably formed by a small smooth rod or wire attached on the surface, such as in end headers 53, but may be effected by machining or otherwise forming the drum surface in proper manner to achieve a ridge of similar character. Drums 22, 23 and 41 as well as rollers 38 and 39 are mounted by center shafts in suitable bearings fitted in frame mount plates 31 at each end thereof. Rollers 39 are arranged to feed the record sheet past the recording line at a rate in accordance with the derivation of the graphic signals to be reproduced, such rate being of either a continuous or an intermittent incremental character as may be desired. One of the pair of rollers 39 and of friction rollers 38 may have a resilient outer surface to provide gripping action and adjustment to the thickness and suface condition of the record sheet. A braking action is applied to rollers 38 to provide a uniform frictional drag on sheet 20 against the pull of feed rollers 39 thereby achieving a smooth and preferably taut surface on the sheet at the recording line to enhance writing definition. Alternatively, this braking action may be applied to supply drum 23 and rollers 38 dispensed with. Writing units 11, 12, 13 and 14 are spaced substantially an equal distance apart, one to the next, along tape 17 for the full length thereof, this spacing being slightly greater than the desired recording line length across sheet 20. Helix drum 22 is rotated by gearing mechanism 26 or other suitable positive drive connection either directly or indirectly linked to pulley 15 to maintain a positive rotary positional relationship with respect to this pulley and with respect to the endwise translatory position of tape 17. Thus with proper initial indexing of drum 22 with respect to pulley 15 the successive writing pens 52 during their recording interval will follow axially along the surface of the drum adjacent to ridge 21 at substantially its nearest approach thereto, with only the record sheet passing therebetween. The helix ridge therefore acts to raise the record sheet slightly at the instantaneous writing point thereby imparting to the sheet surface a curvature convex toward the pen to enhance writing definition.

The guides 18 and 19 are formed and aligned to readily permit passage therethrough of the successive writing actuator units, along with carrying tape 17, in a uniform manner with a minimum of vibration or side-play to aid in achieving controlled writing conditions. Support channels 54 provide mounting of these guides to the side frame plates 28 and 29. Guide 19 is disposed with respect to drum 22 in such manner as to provide passage of the successive writing pens adjacent to the recording line near the surface of the drum preferably so that each pen during its respective writing interval is directed toward the axis of this drum and also moves substantially toward this axis during actual writing. Within guide 19 there is arranged an electrical wiper or commutator strip assembly 49 which is disposed longitudinally therein adjacent to the body of the writing actuators as they pass through the guide. The writing actuator units, which are of electromagnetic design in the present assembly, each carry in suitable location thereon an electrical contact brush assembly 50 to afford electrical contact with strip assembly 49 during the corresponding writing interval thereof. An electrical connection lead 51 is brought out from assembly 49 for connection to an appropriate signal power source in the system to enable activation of writing. In certain apparatus, strip assembly 49 may contain more than one contact strip segment, with respective leads brought out therefrom, to enable activation from more than one corresponding signal power or driving source. A second or return electrical connection to the actuator units may be provided by a second brush and wiper strip combination, not shown, or preferably by a return electrical path through the actuator body to tape 17, on which it mounts, and through guide 19 by virtue of sliding contact of the tape therewith, since these elements may well be of electrically conductive material. Thus the writing actuator units are energized in succession, one at a time, while passing in proper relation to the recording line.

Mounted on or adjacent to guide 19 are a set of ink wells 33, 34, 35 and 36, each of which holds and supplies a different colored ink to respective ones of the set of writing pens to provide for multi-colored ink recording. In apparatus where only single colored writing is to be performed, but one ink well supplies the single colored ink required to the complete set of pens. The ink wells feed the ink through corresponding feed ducts 48 to a corresponding set of ink supply recess channels 44, 45, 46 and 47 which are suitably disposed along the interior surface of guide 19 so as to be adjacent to an appropriate surface of the writing actuator units as they pass through the guide. Each actuator unit carries an ink pick-up or wiper pad 55 disposed on the actuator body so as to mate and contact with a particularly one only of the supply recess channels and receive the particular colored ink therefrom which then feeds to the writing pen thereon. The supply recess channels may each contain a few small holes or a narrow slit leading into its respective supply duct so as to provide a small ink-wetted surface which can contact a supply wiper pad 55. The supply ducts 48 may contain a loose or granulated filler material which provides a capillary action or may be otherwise arranged to provide a limited supply rate of the ink to the recess channels as may be required by the associated writing pens. The ink supply arrangement to the various actuator units may be provided on any portion of their total traverse along their route on tape 17, by appropriate means similar to that herein described. Each writing pen 52 of the total set is designated to write in a particular color corresponding to its associated supply recess channel and in accordance with appropriate actuating color signals received from a scanning or transmitting apparatus in the system. With single-colored writing it is preferable that the wiper pads and the corresponding supply recess channel be approximately centered in guide 19 and with respect to the adjacent surface of the actuator body to aid in actuator stability during writing. Tape 17 is driven in a synchronous manner relative to the associated scanning or transmitting apparatus in the system thereby providing a correlation of the graphic information reproduced. The record sheet advance may provide for recording a full color sequence on each given recording line increment made to register with the writing pen tips, particularly where the writing inks are quick-drying but also effect suitable color mixing when superimposed, in incremental feed steps, or the sheet advance may be at a slow steady rate permitting partial overlap of the successive writing colors corresponding to the sweeps of the successive pens across the sheet. The tips of the writing pens are of a fine rounded and smooth type, preferably of a ball point design, to provide free sliding or rolling contact with the record sheet and determine thereby a consistent recording line of uniformly narrow width.

The electromagnetic type writing actuator units illustrated may be constructed quite small in size to enable being carried on a relatively small tape and may lend themselves to high speed actuation with the actuated elements therein, primarily the writing pen, benig constructed of very light mass of material. Although a set of ink-writing pens are illustrated because of preference in achieving a high writing definition thereby, the writing elements may alternatively be small plungers arranged similarly but effecting pressure through a suitable inked ribbon or transfer film sheet onto the record sheet upon signal activation, as will be described further later on. The small moving plunger mass will again lend itself to high speed writing operation, whereas an extended magnetically operated pressure bar operating against a stylus tip, for example, as an alternate means would not provide equivalent operation due to the relative mass and possible flexure of critical members.

It is to be noted that rotating helix drum 22, although preferably used as described above, may be replaced by a fixed and relatively rigidly supported rod placed under and against the record sheet along the recording line and aligned so that the successive writing pens will operate toward and against this rod, with the record sheet therebetween, during the writing intervals. Such rod may thus impart a relatively small radius of curvature to the record sheet convex toward the writing pen tips along this line and thereby enchance the writing definition to a degree.

The recording apparatus is mounted on a main base plate 32 which supports the side mount plates 31 and motor 24. A cover 37 encloses the general working unit. The upper or actuator-carrying assembly portion swings on hinge rod 43 which passes through the side frame plates 28, 29 and 31 thereby permitting tilting this upper section away from the lower or record-sheet-carrying section for easy replacement and loading the record sheet material into and through its carrying and feed means. Hold-down thumbscrews 40, or similar means, are provided in suitably formed portions of the side frame plates to hold the two main assembly sections together in proper relationship during operation.

Figure 4:
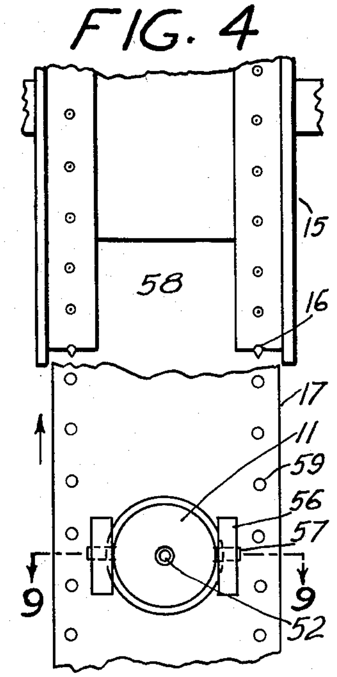
FIG. 4 shows a detail, in plan view, of a possible writing actuator unit, with mounting and carrying arrangement, applicable to the previous figures.

Referring to FIG. 4, carrying tape 17 is shown in relation to driving pulley 15 where sprocket tooth 16 on this pulley engage correspondingly placed sprocket holes 59 in the tape to insure positive drive engagement therefor. In addition, a circumferential recess 58 is provided centrally on pulley 15 to permit clear passage around the pulley periphery of the successive actuator unit bodies mounted on the tape. This recess also applies to pulley 30 of FIG. 1 and any other pulleys used in similar manner to pass the tape and actuator units thereon. The electromagnetic type writing actuator unit 11 is mounted to tape 17 through a suitable clearance hole therein and fastened to the tape by means of mount pins 57 which are imbedded endwise in opposite sides of the actuator body. Pins 57 have a narrow line of mounting contact crosswise to the tape to readily permit flexure of the tape in passing around the pulleys. Attached to pins 57 on the opposite side to their aforesaid mounting contact line are stabilizer leaves 56 which extend lengthwise of the tape and are formed to bear on the tape at their ends when the tape and actuator unit is moving in substantially a straight path, such as through guide 19. Thus leaves 56 tend to provide a degree of stability to the writing pens 52 in terms of uniform translatory motion without rocking or vibration during the writing interval. As the actuator unit moves with the tape around a pulley where the tape curves in conformity therewith leaves 56 tend to lift free of the tape.

Figure 5:
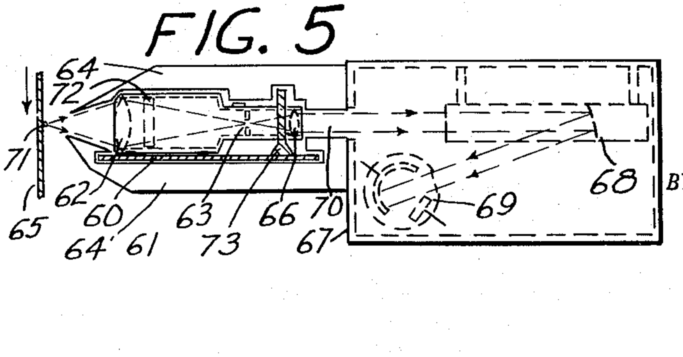
FIG. 5 shows in a side projection view, a portion of a scanning apparatus assembly of a preferred type which may be associated in a system with recording apparatus according to previous figures, and which adheres to principles according to my copending patent application No. 758,143.

Referring to FIG. 5, there is shown in side view a portion of scanning apparatus which is a preferred modification of such apparatus according to principles specified in my copending patent application No. 758,143 on Facsimile Apparatus. Endless scanning tape 60, shown in section, carries at equally spaced intervals along its total length a set of scanning tubes 61 which may be of a hollow cylindrical form mounted crosswise to the tape at approximately right angles to the direction of endwise motion of the tape. Tape 60 is caused to move in endwise translation through scanning guide 64 in a direction substantially parallel to a subject copy sheet 65 at the scanning line thereon, the scanning line passing through point 71 in the view shown, by pulley carrying means and associated primary drive means similar to that described above with reference to tape 17. The subject copy 65, shown in section, is moved past guide 64 in a direction approximately perpendicular to the scanning line thereon by appropriate feed and guide means, not shown. Scanning tubes 61 each contain at the left end, directed toward the subject copy, an optical condensing lens 62 which is focussed on the scanning line, as at point 71, and concentrates light therefrom onto a small pinhole or aperture through an otherwise opaque diaphragm 63 placed crosswise within the tube at a suitable distance from the lens. At the right end of the scanning tube a second converging type lens 66 is suitably spaced from the pinhole and is substantially focussed on the pinhole to form an output light beam therefrom that is substantially parallel in character toward the right. Scanning guide 64, which extends at least the length of the scanning line and is substantially parallel to it, is separated by a flat space or gap 70 between its principal side members which gap includes the passageway for the tape and scanning tubes during the required scanning interval distance. Gap 70 extends to the left near to the subject copy and to the right where it abuts on a mating elongated opening in compartment 67 to which guide 64 may be mounted. An opaque and somewhat elastic light-blocking strip or ridge 73 is attached to tape 60 along its full length at a uniform distance from one edge thereof and stands perpendicularly on the tape surface for a height which spans the gap 70 at that region in the guide. Ridge 73 extends into and slides through an appropriate recess in guide 64 following the tape path therethrough and surrounds the scanning tubes in a manner to effectively prevent light from passing through gap 70 into compartment 67 except desired light that has passed through a scanning tube during its scanning interval relative to the scanning line. Additional light-blocking means, not shown, may be applied near the ends of guide 64 beyond the desired scanning beam interval or range to prevent extraneous light from entering compartment 67. The subject copy is preferably uniformly illuminated along the scanning line by extended type lamps and light-concentrating means, not shown.

Compartment 67 contains an extended type light-collecting reflector 68 and a photosensitive element or photomultiplier 69 which is connected into an appropriate electrical circuit. Reflector 68 may be a portion of a paraboloidal concave mirror, or equivalent means, and is oriented to receive light from any suitable segment along the facing side of gap 70, such light having passed through a scanning tube and having emerged in a parallel beam as aforestated, and reflect portions of that light to a focal point or relatively concentrated cross-sectional area. The photosensitive surface of photomultiplier 69 is positioned substantially at this concentrated cross-sectional area to respond to the light arriving thereat and produce in its associated electrical circuit a corresponding current response. It is a feature of the invention that the parallel light beams emerging from the lenses 66 and entering compartment 67 will also be substantially parallel to the axis of reflector 68, along the desired scanning range, such that these light beams will be concentrated or collected in their turn on the photosensitive surface of the photomultiplier.

For color scanning of the subject copy an optical color filter 72 is mounted in various ones of the total set of scanning tubes where the filter in each separate scanning tube is normally of different characteristic color discrimination from that of the other filters of the set employed. However, a multiple color scanning sequence may be effected over the total set of scanning tubes by repeating a color filter sequence applied to a lesser group than the total set, particularly if the lesser group is a submultiple of the total set of scanning tubes available. For certain purposes in the process of graphic color reproduction one or more of the total set of scanning tubes may not contain a color filter. There will be derived in the photomultiplier circuit a set of signal current responses corresponding to the successive light transmissions through the scanning tubes as they actively scan over the subject copy, including modifications thereof due to the color discriminating filters however they are used. The signal response will of course be affected by the illumination applied to the subject copy, the characteristics of the subject copy itself and the spectral response of the photomultiplier, as well as other factors in the system. It is intended that appropriate synchronizing signals will be developed with respect to the scanning apparatus which may be applied to an associated recording apparatus in the system, such as recording apparatus hereinbefore described, to permit a correlation of the graphically recorded information, including the color content thereof, with respect to that in the subject copy. The color filters 72 may be omitted from the scanning apparatus when so-called monochrome graphic signals only are intended.

With regard to scanning apparatus, as described, where color filters are employed it is to be noted that white area or light colored area scanned on the subject copy may cause light transmission through various of the filters of the same order as scanned colored area corresponding to the particular filter concerned and result in a similar order of signal response in the output. Thus "white" area signal response may be equivalent to a high response from each and every one of the scanning color discriminations desired according to the filters employed in the successive scanning tubes. If then, in the associated recording apparatus the several writing colors employed corresponding to the scanning color discriminations are caused to mark in superposition over an equivalent recording area corresponding to the white or very light area scanned, the combined marking in conjunction with the record sheet color or characteristics may produce a white or light colored resultant recorded effect on that area. This situation may be achieved particularly where the several writing inks, marking film or the like, mix satisfactorily either by themselves or in conjunction with the record sheet color to produce a suitable white or light-colored combined effect. However, since the achievement of a substantially white writing due to the mixing or superposition of several possibly intense marking colors as may be desired is deemed a rather critical matter, a modification of the scanning apparatus and of the corresponding mode of recording apparatus operation may be adopted to accomplish an equivalent result. Such modification will now be discussed.

Figures 6, 7:
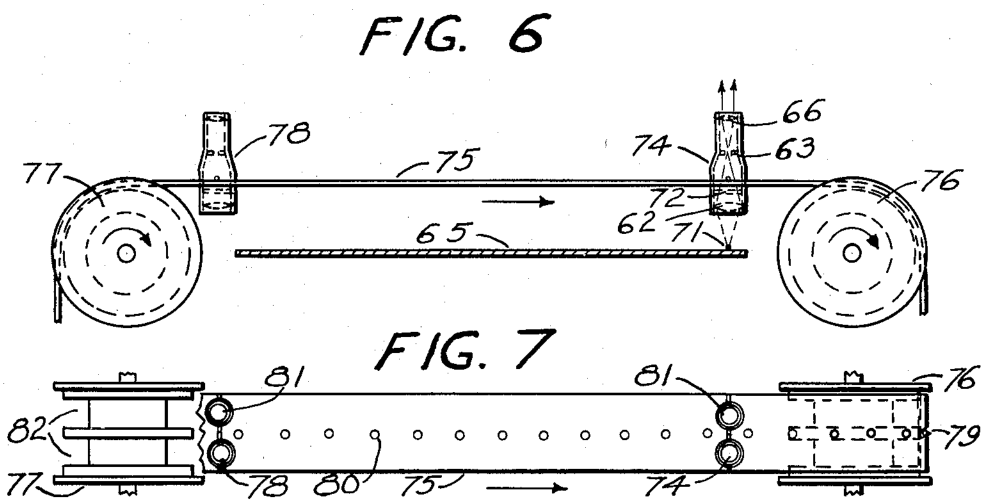
FIG. 6 shows in front projection, a possible scanning tube and carrying tape means applicable to multi-color scanning apparatus.
FIG. 7 shows in plan view, a projection of FIG. 6 with a portion of tape cut away to reveal other details.
Figure 8:
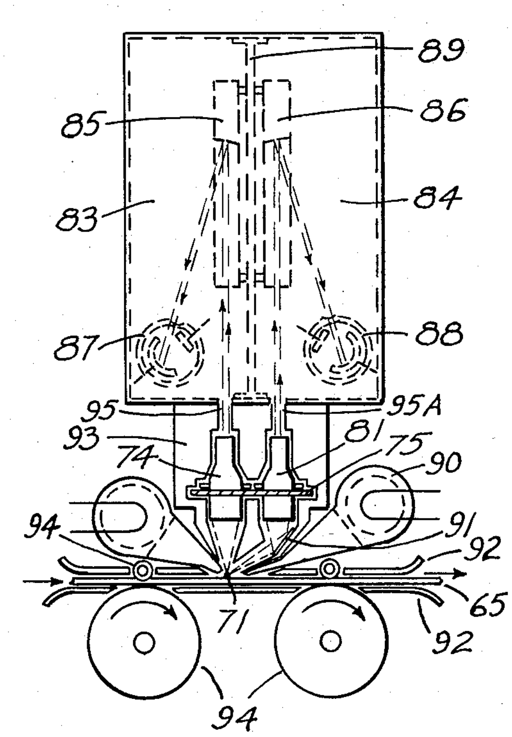
FIG. 8 shows in a side projection view, details of a multi-color dual scanning arrangement utilizing the means of FIGS. 6 and 7.

Referring to FIGS. 6, 7 and 8, a more complex scanning arrangement is illustrated wherein scanning tape 75 is carried in endwise translation through the apparatus by driving pulley 76 and driven or idler pulley 77, and with such additional pulleys as may be necessary, according to principles previously described. Tape 75, which is an endless type, has mounted on one widthband thereon at equally spaced intervals for the full length thereof a series of color scanning tubes 74, 78 etc., each similar to the scanning tubes 61 previously described and several ones of the tube set containing a color filter in similar manner to that described above with respect to scanning tubes 61. Along a separate and adjacent widthband to the first on tape 75 there is mounted a second set of scanning tubes 81, each without a color filter therein, also placed at equally spaced intervals lengthwise of the tape with one each of the second set placed side by side with or abreast of one ecah of the first or color-discriminating set of scanning tubes. Both sets of scanning tubes contain the lens elements 62 and 66 and the pinhole diaphragm 63 in each, as previously described, and produce an output light beam of substantially parallel or non-diverging character from each when focussed on an elemental scanning area such as point 71 on the scanning line of subject copy 65. The scanning tubes are mounted in an upright position through clearance holes in tape 75 such that they are directed in pairs, one color discriminating and the other not color discriminating in each pair, with their axes aligned toward two substantially parallel lines across the subject copy during their respective scanning intervals. Driving pulley 76 contains a set of sprocket teeth 79 around its periphery which engage sprocket holes 80 in the tape to provide positive drive engagement therefor. Pulleys 76 and 77 each contain a pair of peripheral recesses 82 in a manner to permit erady passage of the successive pairs of scanning tubes around the pulleys while being carried by the tape.

The subject copy 65 is fed at a predetermined rate past the dual scanning guide 93 by means of the paired feed rollers 94 cooperating with copy guide plates 92 on either side thereof. The copy is effectively illuminated along the scanning line thereof by extended type lamp assemblies 90 on either side of guide 93. The successive scanning tube pairs, for example tube 74 and tube 81, are carried by tape 75 through guide 93 in a direction substantially parallel to the scanning line of the subject copy and at a suitably spaced distance from the scanning line during the scanning interval of the tube pairs. The color scanning tube set, such as tube 74 illustrated, may be focussed directly on the scanning line, as at point 71, and produce an output light beam of substantially non-diverging character which passes through the extended interspace or gap region 95 and into compartment section 83 through an elongated opening therein which opening abuts and aligns with the facing edge of this gap region in the guide 93. Each of the second set of scanning tubes 81 in its turn during its respective scanning interval while passing through guide 93 is focussed on substantially the same elemental area of the scanning line as is a particular tube of the first or color scanning set that is paired with it and scanning simultaneously therewith. The tubes 81 also produce an output light beam that is substantially non-diverging in character which beam during the scanning interval relative thereto passes substantially unobstructed through the second interspace or gap region 95A in guide 93 and enters the second compartment section 84 through a suitably arranged elongated opening therein. Indirect focussing of the tubes 81 onto the scanning line, as at point 71, is provided by the extended reflector strip 91 of suitable dimension and position in guide 93 which enables this required focussing throughout the respective scanning interval of each of these tubes in succession. However, it may be understood that the scanning tubes of both sets may be focussed directly on the scanning line by appropriate tilting of the optical axes of the tubes of either or both sets with respect to that illustrated in reference to the subject copy. Compartment section 83 is substantially separated from compartment section 84, with respect to light entering therein, by partition 89. Section 83 contains an extended light-collecting reflector 85 which is of a parabolic type, similar to reflector 68 previously described in reference to FIG. 5, and which receives the output light beam from a color scanning tube, as tube 74 shown, during any portion of its scanning interval and reflects this beam onto the photosensitive element of restricted area in photomultiplier 87 which is also contained in this compartment section. Similarly section 84 contains the extended light-collecting reflector 86, which is similar to reflector 85 but oppositely placed, which receives the scanning output light beams from the successive tubes 81 during any portion of their respective scanning intervals and reflects each such beam in its turn onto the restricted photosensitive element of photomultiplier 88 contained within the compartment section. Photomultipliers 87 and 88 are connected into separate and appropriate electrical circuits thereofor wherein a corresponding current response is produced in each in accordance with the incident light on their respective photosensitive elements received from the respective scanning tubes associated therewith. Thus the signal response produced in the circuit associated with photomultiplier 87 will reflect the scanned color content of the subject copy in accordance with the particular color filters employed in the corresponding set of scanning tubes 74, 78, etc., as well as in accordance with other factors. Similarly the current response in the circuit associated with photomultiplier 88 will reflect primarily the total light contrast or "white content" of the subject copy areas scanned simultaneously by the second set of scanning tubes 81, each tube of this second set scanning subtantially the same elemental area as a particular tube of the first or color scanning set that is paired with it.

The current response associated with photomultiplier 88 may be applied in a control or gating manner, by means well known to the art, to substantially suppress the signal response due to photomultiplier 87 in the output from the scanning apparatus where that signal response results from predominantly white elemental area being scanned by one of the color scanning tubes rather than from the particular color or color range intended to be selected for response signal by the particular color scanning tube concerned. In the associated multi-color recording apparatus in the sytsem, such as that previously described herein, the several writing colors employed may be correlated directly with the intended color scanning selections of the color scanning tubes in the scanning apparatus and the writing of a particular color therein may be effected only when the particular graphic color signal associated with the corresponding color scanning tube has not been suppressed in the scanning apparatus output and is therefore presumed to represent the particular color intended or desired. If, then, in the recording apparatus writing actuation is effected only upon receipt of a definite and proper graphic output signal from the associated scanning apparatus and the record sheet is of white or light colored background or base material, the suppression or withholding of a particular graphic signal therefrom and the corresponding withholding of writing thereon relative to a given area will result in a white or light colored record relative to the area concerned. In the signal output control or gating function in the scanning apparatus a white pickup limit or threshold would normally be established relative to the current response in the circuit associated with photomultiplier 88 above or beyond which an otherwise misleading graphic color signal resulting in photomultiplier 87 with its associated circuit would not be permitted to be transmitted to the recording device. In the color scanning tube set in the scanning apparatus one or more tubes of the set may be arranged, either with or without a color filter therein, to scan the subject copy for black versus white area or content and may be correlated and coordinated with one or more corresponding black- or dark-writing actuator units in the recording apparatus if desired. Similarly other color correlations may be effected between the scanning selections or discriminations made in the scanning apparatus and the writing colors and effects performed in the recording apparatus.

It is to be noted in the above with reference to the scanning apparatus described that the various scanning tubes specified may contain a lesser number or a greater number of lens elements, either with or without an associated pinhole diaphragm, to achieve the desired output beam of substantially non-diverging character and representative of an elemental scanning area. It is to be further noted that the light-collecting reflectors 85 and 86 or 68, as the case may be, can be replaced by an extended type lens of such form as to be able to receive any of a series of scanning light beams emitted and passing in a given direction from an extended scanning line or equivalent range and redirect these light beams having proper direction only substantially to a focal point or concentrated cross-sectional area where a photosensitive element may be placed to achieve the purposes of the invention.

Figure 9:
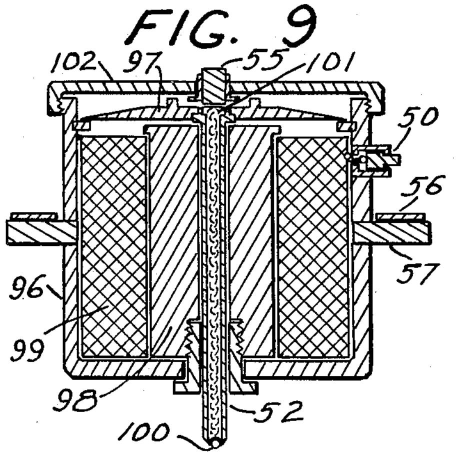
FIG. 9 shows in sectional view, as indicated in FIG. 4, possible details of construction of an electromagnetic type writing pen and actuator unit.

Referring to FIG. 9, constructional details of an electromagnetic type writing actuator unit with provision for direct ink writing are illustrated. Magnetic shell 96 contains a central magnetic core 98 and an operating coil 99 which upon being electrically energized pulls in the thrust armature 97 which is of a stiff circular spring type and to which is attached the centrally located writing pen shank 52. The pen shank is of a hollow tubular type which is filled with a suitable packing of filler material 101 possessing absorptive or capillary characteristics with respect to writing ink supplied to it at the upper shank end to lead this ink through to the rotatable ball point tip 100 at the lower shank end. With this filler material the ink absorbed therein is substantially prevented from shaking about excessively while the pen shank may be in rapid motion during its writing function. An ink pickup or wiper pad 55, mounted in the actuator cover 102, supplies ink to the filler material upon contact therewith during a portion of the stroke of the pen shank. The thrust armature together with the writing pen, which includes the shank, tip, filler material and ink contained therein, are normally of small total mass in order to permit rapid operation thereof for high speed writing while requiring but moderate activating signal energy applied to the operating coil, the armature and writing pen being the moving elements responding to the activating graphic signals applied to the unit. The pair of mount pins 57 are imbedded in opposite sides of the shell and carry the stabilizer leaves 56, as previously described in reference to FIG. 4. The electrical contact brush assembly 50 is arranged in suitable location on the magnetic shell to enable application of appropriate graphic signals of electrical form to the operating coil which has one end of its winding connected to the brush. The other end of the coil winding is connected to the magnetic shell enabling completion of the signal path therethrough, the coil being otherwise insulated from the shell and central core. Suitable bearing and positioning or guiding surfaces are provided for the moving thrust armature and writing pen. The downward thrust of the pen tip into contact with the record sheet upon pull-in of the thrust armature enables ink writing on the sheet by the ink-wetted ball point tip.

It is to be understood that the writing actuators which are applicable to recording apparatus as hereinbefore described and which are responsive to graphic recording signals of electrical form may be arranged according to various modifications with respect to the actuator just described. For example, the electrical driving or thrust means for the pen may be a piezoelectric crystal with associated lever or link means coupling to the pen in a manner to multiply the motion of the crystal as it applies to the pen or may be a movable coil operating in a magnetic field and suitably coupled or linked to the pen, the coil being signal activated. In addition, the ink-writing pen may be used without ink as, or replaced by, a writing plunger of similar form which plunger may at each writing instant apply pressure corresponding to an elemental marking area through an inked ribbon, strip or sheet or through a ribbon, strip or sheet having a transfer marking film thereon and in proper orientation onto the record sheet to effect appropriate marking thereon. The ribbon, strip or sheet carrying the ink or transfer film or coating may be held adjacent to the recording line and moved with respect thereto in order to present to the writing plungers a fresh marking area thereon from time to time during the recording process. For multi-colored recording the marking ribbon, strip or sheet may contain a set of marking bands, each of a different marking color and each capable of being separately and individually aligned along and adjacent to the recording line in coordination with the passage of particular ones of the set of writing plungers along the recording line in synchronism therewith thereby permitting the writing successively in each of the set of marking band colors by successive writing plungers corresponding thereto. The marking bands are normally extended at least the length of the recording line and are aligned immediately over and adjacent thereto and maintained in such alignment during the sweep of a particular writing plunger, corresponding to the band, along the said line. The resultant multi-colored recording by this means will thus be on a line sequential basis with respect to each color employed.

The writing actuators, whether they be of the ink-containing pen type or of the plunger and marking strip type, may be activated by mechanical or hydraulic signal energy transfer means as well as by electrical signal energy transfer means.

Figure 10:
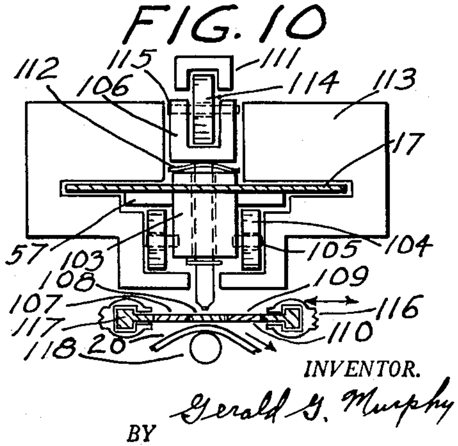
FIG. 10 shows in end projection view, details of arrangement of a mechanically operated writing plunger unit and related writing transfer ribbon, with ribbon guide, applicable to an assembly such as that of FIG. 1.

Referring to FIG. 10, a writing unit body 103 is carried during its writing interval through the extended guide 113 on a set of lower roller wheels 104 which mount and turn on shaft pins 105 fastened at one end into the body. The body mounts to endless carrying tape 17 by means of mount pins 57 in a manner similar to that specified with respect to previously described writing actuator units, and holds a writing plunger 106 which is slidable vertically therein and contains a forked upper end in which mounts an upper or driving roller wheel 114 on the through shaft pin 115 held crosswise in the forked end. An extended pressure bar or inverted pressure channel 111 of length similar to that of the recording line and activated by external energy means pushes the writing plunger at any appropriate time during its writing interval downward into pressure contact with a multi-colored marking ribbon 110, shown in section, which is held by ribbon guide 116 immediately over and adjacent to the record sheet 20 along the recording line thereof to effect graphic recording thereon. The downward thrust of the writing plunger is effected by engagement of the channel 111 with the driving wheel 114 only during the appropriate writing interval of the writing unit and is applied against the return force of the bowed spring washer 112 between the body and the forked end of the plunger. The upper and lower roller wheels are employed to provide controlled writing conditions with a minimum of frictional drag of the writing unit while passing through guide 113 under the carrying force of tape 17.

The marking ribbon contains the extended and separate color bands 107, 108 and 109, each of similar form but of different marking color, lengthwise thereon for a length greater than that of the recording line and may be fed endwise by appropriate means through the guide 116 in a direction making a small angle with the recording line in order to present fresh marking area thereon to successive writing plungers, the ribbon having enlarged edge ridges 117 to permit a slidable grip thereof by the opposing members of the ribbon guide 116. A rigid backing rod or blade 118 is placed beneath the record sheet along the recording line against which the plunger pressure is applied through the ribbon and record sheet, the blade being in substitution for the rotatable helix drum 22 described previously with respect to FIGS. 1, 2 and 3. The ribbon and ribbon guide are moved sidewise with respect to the recording line, by external means not shown, in suitable increments to present a particular marking color band to particular ones of the set of writing units carried successively past the recording line by tape 17, in suitable manner and normally in synchronism with the derivation of corresponding graphic color signals in an associated scanning apparatus or transmitting apparatus in the system, to effect multi-colored graphic recording in a predetermined manner or pattern. The marking band color shift may or may not be effected at or just prior to the beginning of the stroke or sweep of each writing unit of the set over the recording line according to the means of color coordination employed between the scanning or transmitting apparatus and the recording apparatus and according to the recorded effects desired. Obviously, for single color recording the marking the marking ribbon would be of one color marking characteristic and the sidewise shift of the ribbon and ribbon guide may be omitted.

A multi-color graphic reproduction system may be effected on an element- or dot-sequential basis according to principles hereinbefore described. For example, the scanning apparatus may be of a type similar to that illustrated in FIG. 8 wherein the scanning tape carries a series of scanning tube clusters past the scanning line of the subject copy and through a scanning guide in similar manner to the tube pairs described therein, each tube cluster being spaced equidistant from the adjacent clusters along the tape and all tubes of each cluster scanning simultaneously substantially the same element of the scanning line. Each tube cluster is substantially the same in all characteristics as the other clusters of the series and contains a group of scanning tubes similar to tubes 74 and 81, previously described, and each effecting a different color discrimination with respect to the subject copy elements in terms of its output light beam, the group including a scanning tube that is non-color discriminating to guage in effect the total reflected light or "white content" with respect to the scanned elements. Each tube of the cluster is associated with a separate and particular compartment section, light-collecting reflector, photomultiplier and electrical circuit related thereto in a manner similar to that previously described and effects a signal response in its associated circuit in accordance with the combined optical factors related thereto. As the subject copy is moved at a predetermined rate and in similar manner to that previously described the successive scanning clusters scan successive scanning lines thereon during their respectively successive scanning intervals. Each compartment section, light-collecting reflector and photomultiplier with its electrical circuit is associated with a particularly corresponding tube in each and every one of the series of tube clusters such that the signal response in each photomultiplier circuit is representative of a particular color discrimination or color scanning selection with respect to the copy in accordance with the particular scanning tubes and related elements associated therewith, and such signal response may be termed a color signal of a type identified by its associated elements as stated. The several simultaneous color signals obtaining in the several photomultiplier circuits are representative of the scanned copy on an element-sequential basis and may be employed in a number of ways to activate a corresponding graphic recording apparatus in a graphic reproducing system to achieve a color reproduction corresponding to the subject copy. It is to be understood that suitable synchronizing signals are derived in the scanning apparatus or its associated circuitry which may be applied to the recording apparatus for correlation of the graphic color signals therein. The color signals may be compensated or modified in various ways to accommodate system requirements, efficiencies or other factors related to either the scanning apparatus or the recording apparatus, including combination with suitable synchronizing signals, in effecting therefrom the combined output signals from the scanning apparatus.

In a second apparatus arrangement for simultaneous or element-sequential multi-color graphic reproduction, the scanning apparatus may again be similar to that described with reference to FIGS. 6, 7 and 8, or similar to that described with reference to FIG. 5, wherein the color filters 72 are omitted from the series of color scanning tubes and the output light beam from these tubes is directed through a light dispersion prism, which is extended in uniform manner substantially parallel to the scanning line for a distance equivalent thereto, during the active scanning interval of each tube of the series in succession. The dispersed beam through this prism constitutes a light color band which with proper prism orientation has an angular divergence in a plane substantially perpendicular to the scanning line in accordance with the wavelength thereof. A grating or screen with discretely spaced aperture slits therein extending substantially parallel to the prism and for the length thereof is placed at a discrete distance from the prism in the path of the dispersed beam therethrough to effectively segregate particular color segments of this beam over the scanning interval in accordance with the particular arrangement of the aperture slits. An extended cylindrical lens of length equivalent to an aperture slit may be employed with its principal focus substantially along a particular aperture slit in a manner to receive the particular light color segment passing therethrough and redirect this segment into a substantially parallel beam, at least in a plane substantially perpendicular to the scanning line, whereby a series of such cylindrical lenses, one each associated with a particular aperture slit and corresponding color segment, produces a corresponding series of color segment output beams of parallel character and diverging from each other angularly in a plane substantially perpendicular to the scanning line. A corresponding series of light-collecting reflectors effective over the scanning interval each respectively in itself, each associated with a particular photosensitive means and corresponding electrical circuit means respectively in a manner such as described in reference to FIG. 8, are arranged to each respectively receive and respond to a particular one of the series of color segment output beams corresponding thereto and produce therefrom a corresponding graphic color signal in a manner similar to that previously described. The resultant set of graphic color signals obtaining in the series of electrical circuit means may be compensated or modified in various ways to accommodate system requirements, including combination with appropriate synchronizing signals, in effecting therefrom the combined output signals from the scanning apparatus. In alternative apparatus modifications, a second set of scanning tubes with associated reflector, photosensitive means and circuit means, may be employed in a manner such as described in reference to FIGS. 6, 7 and 8, to effectively guage the "white content" of the subject copy concurrently with the color scanning tube series and effect control or suppression of certain graphic color signals in the scanning apparatus output which may not be representative of the corresponding subject copy information.

The complete recording apparatus associated in a system with scanning apparatus for element-sequential multi-color graphic reproduction, as just described, may include a set of recording apparatus units, in one instance, where each unit is similar to that hereinbefore described, either of the ink-writing type or of the plunger and marking strip type. Each unit of the set is arranged to accept and respond to a particular color signal only, as well as appropriate synchronizing signals, to effect writing therefrom in a single corresponding color only upon a correspondingly separate record sheet in conformity with the color signal received and in correlation with the original subject information. The several recording apparatus units of the set each respond respectively to one each of the several color signals in particular correlation thereto, whereby the several color signals are all separately and appropriately recorded simultaneously on a corresponding set of record sheets which are each preferably of a transparent or translucent character. Where the several separate record sheet color recordings are made on substantially an equal dimensional correlation with respect to the original subject copy a direct overlay of corresponding areas of the record sheet set after recording will provide in combination an overall multi-colored graphic reproduction corresponding to the original subject information.

In a second instance with respect to recording means associated with the element-sequential multi-color scanning apparatus hereinbefore described, the recording apparatus may be a single apparatus unit of the plunger and marking ribbon or strip type, as described previously, wherein the marking ribbon contains multi-color marking bands which are each capable upon plunger engagement thereto of effecting corresponding marking colors upon a single record sheet associated therewith. Any particular one of the marking color bands may at a proper time therefor be shifted rapidly and momentarily, by an appropriately responsive mechanism together with its associated signal-actuating means, into marking position with respect to any particular one of the writing plungers upon receipt of and response to a respectively corresponding one of the several color signals. The signals carry a color information portion which is applied to effect appropriate shift of the marking color bands into marking position in accordance with the momentarily predominating color of the available group, and carry an amplitude and duration information portion which is applied to the writing units for actuation of their writing function at proper instants therefor. By this means, where appropriate synchronism is maintained between the scanning and the recording processes, an element-sequential or simultaneous type of multi-colored graphic recording may be effected on the single record sheet in correspondence to the original subject information. In this second instance of recording means it is preferable that the actuation signals applied to the writing units be of a rapidly interrupted type to effect corresponding rapid interruption of the plunger marking pressure and thereby enable relatively free and rapid shift of the marking strip color bands into marking position when required, even when the marking strip is under appreciable average marking pressure.

There are, of course, other recording apparatus means by which an element-sequential type of multi-colored graphic recording may be achieved while utilizing the simultaneous type multi-color graphic signals hereinbefore described. For example, the recording means may utilize a set of light sources each of which is respectively signal-modulated in intensity in accordance with a particular one of the received color signals and is applied through a color filter or similar color-discriminating medium corresponding to the respectively associated color signal and through suitable optical defining means to form a recording color spot. The resultant set of recording spots which are representative of the received signal color and intensity information, are directed by appropriate means and in systematic manner upon a recording film of multi-color type, or similar recording medium, simultaneously and in dimensional correlation with the original subject information. The film or similar recording medium may subsequently be developed to produce the final result.

In the invention recording apparatus which utilizes tape-carried writing elements or writing units there are many ways, in addition to those previously described, in which the writing elements or writing units may be arranged whereby they are respectively individually and successively signal-activated during their respective writing intervals only to accomplish their respective writing functions as previously specified. For example, in one arrangement the writing elements, which may be pens or plungers as the case may be, are of very small mass and are mounted directly and rigidly to the tape at substantially equally spaced intervals therealong in a manner to protrude toward the record sheet during their respective writing (or recording) intervals. The tape, which is endless and of electrically conductive material, is caused to pass through a magnetic field which is extended in uniform manner adjacent to the recording line for a distance equivalent to the length thereof and which is directed uniformly crosswise to the tape motion and also crosswise to the intended direction of pen or plunger motion adjacent to the recording line. The received writing signals of electrical form are coupled electromagnetically into the tape at any suitable point along the traverse thereof by a coupling coil, preferably of a toroidal form surrounding the tape, such that the coupled signal currents resulting in the tape cause the tape, along with a momentarily and appropriately positioned writing element carried therewith, to be thrust toward or away from the recording line in conformity thereto and while in the magnetic field range only and thereby effect writing or withholding of writing by the writing element a proper instants relative to the recording line. The tape is guided in proper spaced relationship with respect to the recording line to permit contact of the pens or plungers only with the record sheet or marking strip, as the case may be. Appropriate marking material, whether of ink or of transfer film type, is supplied to the writing elements in a manner such as previously specified.

In a second arrangement of tape-carried writing elements, the pens or plungers, as the case may be, are of very small mass and are principally of magnetic material. The writing elements are mounted on the carrying tape, which in this case is of non-magnetic material, at substantially equally spaced intervals therealong with the interval distance slightly greater than the recording line length, in a slidable manner such that they may slide toward or away from the recording line during their respective writing intervals. As the tape is guided in proper spaced relation to the recording line the successive writing elements carried therewith are respectively in turn caused to pass adjacent to the elongated poles of a driving electromagnet, which poles are extended near the recording line for substantially the length thereof. With proper orientation of these poles, as the driving magnet is magnetized in a signal-activated manner in accordance with the received graphic signals, by suitable electrical excitation means, the writing elements are individually and in turn, during their respective recording intervals only, thrust, preferably against an opposing return spring force, toward or away from the recording line in response to the appropriately directed magnetic attraction or repulsion applied thereto at proper instants for effecting recording. The writing elements, of course, are limited in their permissible slidable travel by appropriate mounting means. Marking material is supplied to the writing elements in a manner such as previously specified.

In a third arrangement of tape-carried writing elements, the pens or plungers, as the case may be, are slidably mounted on the tape in appropriate orientation, in a manner similar to that just previously described, and each is respectively associated with an individual driving coil of substantially rigid form and mounted substantially rigidly thereto but normally insulated therefrom except perhaps at one terminal of the coil. The driving coils are responsive to electrical current excitation, are provided with respectively associated commutating electrical contact or brush means similar to that hereinbefore described, and are preferably arranged in a flat stiff form in a regular and balanced manner to enable their passage through a relatively narrow magnetic gap. One or more fixed magnetic fields of uniform and preferably high intensity are arranged across one or more corresponding magnetic gaps which are suitably oriented and aligned in spaced relation with respect to the recording line and for an equivalent length thereto such that the successive driving coils or portions thereof are in turn enabled to pass in uniform manner through these gaps for the duration of the recording intervals only related to their respectively associated writing elements. The received graphic signals are applied as activating currents individually to the successive coils during their respectively related recording intervals only, through their respective commutating contact means, while the tape and successive writing elements are guided in proper spaced relationship with respect to the recording line. With suitable arrangement of the coils and the magnetic gaps, the activating currents cause the coils and their associated writing elements (pens or plungers) to be thrust toward or away from the recording line in conformity to the graphic signals to effect corresponding writing on the record sheet in conjunction with appropriate marking material supplied to the writing elements in a manner such as hereinbefore described.

In still a further arrangement of tape-carried writing units, the writing elements are again slidably mounted on the tape at suitably spaced intervals, as previously described, and each element is directly or indirectly connected to the driving end of a magnetostrictive actuating body or rod, such as a rod of ferrite material of suitable proportion and magnetostrictive characteristic, whose reference motion end is attached substantially rigidly with respect to the tape. A graphic signal-actuated magnetomotive force is applied in proper direction and manner to the successive rods individually in turn during their respective writing intervals only, either by external magnetic field means or by a wound coil on each rod which is individually signal-excited at the proper times only, whereby the driving end of the rod thrusts the writing element toward or away from the recording line to effect appropriate writing thereon in conjunction with the marking material supplied to the writing element in a manner similar to that previously described.

In the various invention recording apparatus arrangements as described, the several writing units, or writing elements as the case may be, that are tape-mounted are normally carried by the tape substantially linearly and repetitively in turn past the recording line during their respective writing intervals during which time the units, or elements, are individually signal-actuated or signal-driven to effect a corresponding writing condition by appropriately associated driving means as described. A writing unit is understood to include portions of the signal-activated driving means related to a writing element as well as the writing element itself.

It is to be understood that, where ink-writing pens are employed in the recording apparatus a Hectograph type duplicating ink may be applied thereto, if desired, to afford the possibility of securing duplicate copies of recorded information, obtained thereby in the apparatus, by means of the respectively associated Hectograph type duplicating process. Similarly, certain ones of the various other inks, inked sheet or strip, or transfer film marking materials that may be employed in various arrangements of the invention recording apparatus may lend themselves to corresponding duplicating processes, of similar general nature to the well known Hectograph or Ditto processes, with respect to the recordings resulting therefrom, wherein the recordings function as the master copy in similar manner as in the Hectograph process. Of course, duplication of recordings obtained from the invention apparatus may be effected by various other well known methods since the record sheet material applicable thereto may be of any desired opacity or transparency and color within practical limits and the marking materials employed therewith may provide practically any desired degree of light contrast or of color contrast related to the record sheet material.

In the invention scanning apparatus, as hereinbefore described, certain modifications may be applied to effect simplification thereof or for other purposes. For example, in one modification the tape-carried scanning tubes may each be respectively replaced at an equivalent location on the tape by a single optical lens of such type and in such manner that during the scanning interval related thereto the principal focus of the lens may lie on successive points substantially along the scanning line and light from an elemental scanning area upon passing through the lens will emerge as a substantially parallel output beam of proper direction with respect to the light-collecting means as previously described; a fixed aperture may additionally be employed substantially at the concentrating point of the light-collecting means to restrict the scanning beam light impinging upon the photosensitive means, spaced adjacent to the aperture, and thereby aid in defining the elemental scanning area. In another modification, wherein multi-color scanning is intended, the tape-carried scanning units, which may comprise scanning tubes similar to those previously described, may in the scanning unit series effecting color selection or discrimination each individually contain a small light-dispersion prism in suitable orientation, placed preferably in the path of the parallel scanning light beam derived therein, to effect a color band separation in the output beam therefrom according to principles previously described, whereby corresponding multi-color type graphic signals may be derived in a manner similar to that described hereinbefore. It is a feature of the invention scanning apparatus that the scanning units carried by the tape means, whether they be of the lens and aperture tube form as illustrated or of other configuration or orientation, substantially define an elemental scanning area on the scanning line and derive from the reflected light pertaining thereto an output light beam or set of beams each of which are of substantially fixed direction or orientation such that each output beam is or may be redirected by fixed optical means to be substantially parallel to the principal axis of a particularly associated light-collecting means and may be so maintained over substantially the entire scanning interval relating to the particularly associated scanning unit.

It will be evident to those skilled in the art that many modifications, combinations or applications of the several elements and means of the present invention, other than that hereinbefore described, are possible in accordance with the invention principles disclosed herein. All such modifications, combinations or applications of the invention apparatus or of the principles and means pertaining thereto are to be considered within the scope and spirit of the invention except as limited by the hereinafter appended claims.

What is claimed is:

1. In continuous scanning apparatus for scanning an elongated copy medium, means for advancing the copy medium in the direction of its length, means for illuminating substantially uniformly a transverse scanning line of the copy medium, means for scanning successive elemental portions along said line including an elongated endless conveying member and a plurality of housed scanning units carried by said member at substantially equally spaced intervals along the length of said member, said intervals corresponding substantially to the length of the scanning line, means for moving said member lengthwise in a direction substantially perpendicular to the direction of movement of the copy medium, a light-sensitive device fixed in position and having a light-pickup surface whose dimensions are small in comparison with the length of said line, a fixed narrow and elongated optical element for directing substantially parallel light rays received from said scanning units onto said pickup surface, each of said units having means including optical means focussed substantially upon a plane which includes the said scanning line for receiving light rays from said line and for redirecting said rays so that they are substantially parallel to each other and substantially perpendicular to said line and are then directed to said optical element for transmission in turn to said pickup surface.

2. Apparatus according to claim 1 wherein each of said scanning units includes a lens focussed substantially upon the said scanning line during the respective scanning interval of said unit.

3. Apparatus according to claim 2 wherein each of said scanning units includes a partition having a small aperture through which pass light rays from said lens, and each of said units also includes a second lens for receiving the light rays from said aperture and for redirecting said rays so that they are substantially parallel to each other.

4. Apparatus according to claim 3 wherein one or more of said scanning units also includes a light color discriminating means carried in said last-mentioned unit for movement therewith by said conveying member for effecting selection of light rays of substantially one particular color only pertaining to each respective one of said units from which said light rays are permitted to emerge.

5. Continuous scanning apparatus for scanning an elongated copy medium comprising, means for advancing the copy medium in the direction of its length, means for illuminating a transverse scanning line at the copy medium, means for periodically scanning successive incremental longitudinal portions of said line including an elongated endless conveying member and a plurality of scanning units which are carried by said member and which are spaced apart at substantially equal intervals lengthwise of said member, each of said units having light input and light output apertures, means for substantially shielding other portions of said units from extraneous light during the respective scanning intervals of said units, means for moving said member lengthwise in a direction substantially parallel to said line, a fixed light-sensitive device having a light-pickup surface the dimensions of which are small in comparison with the length of said line, a fixed elongated optical element for receiving a series of substantially parallel light rays from the output apertures of successive ones of said scanning units and for directing said light rays onto said small pickup surface, means for substantially shielding extraneous light from said optical element and from said pickup surface, each of said units having means including optical means focussed through its input aperture substantially upon said scanning line for receiving light rays from said line and for altering the direction of said rays so that they are substantially parallel to each other and are then directed in paths substantially perpendicular to said line to impinge upon said optical element for transmission in turn to said pickup surface.

6. Apparatus according to claim 5 wherein said optical element has a reflecting surface contoured with the shape of at least part of a parabolic surface whereby said series of substantially parallel light rays incident upon said reflecting surface from the output aperture of successive ones of said scanning units is reflected therefrom to converge upon said small pickup surface.

7. Apparatus according to claim 5 wherein each of said scanning units includes a lens focussed through its input aperture substantially upon said line.

8. Apparatus according to claim 7 wherein each of said scanning units includes a wall portion having a small aperture to define an elemental scanning area of said line and through which pass the light rays from the lens of the respective scanning unit, and each of said units also includes a second lens for receiving the light rays from the said small aperture of the respective scanning unit and for altering their direction so that they are substantially parallel to each other and are also substantially perpendicular to said line as they leave the output aperture of the respective scanning unit.

9. Apparatus according to claim 5 wherein the scanning line is substantially a straight line and wherein each of said scanning units is mounted on the same one side only of said conveying member and wherein each of said scanning units during its respective scanning interval is carried by said member in a path substantially parallel to said scanning line, each of said units having means including a lens focussed substantially upon said scanning line during its respective scanning interval for forming said series of substantially parallel light rays at the output aperture of the respective scanning unit, whereby the light rays received by each scanning unit from said line pass through the respective scanning unit.

10. Apparatus according to claim 9 wherein one of said scanning units has color discriminating means carried therewith by said conveying member for selectively passing through said one unit only light rays of substantially one color and wherein the next succeeding scanning unit on said member has color discriminating means carried therewith for selectively passing through said next unit only light rays of substantially one color which is different from said first-mentioned color, said optical element being positioned to receive the light rays emerging from the output aperture of successive ones of said scanning units in turn.

11. Apparatus according to claim 5 wherein said scanning line is straight and wherein each of said scanning units is mounted on said conveying member at a respective aperture formed in said member so that said input aperture of each scanning unit during its scanning interval faces the copy medium and so that said output aperture of each scanning unit during its scanning interval faces in the opposite direction away from the copy medium, each of said scanning units during its scanning interval being carried by said conveying member in a path substantially parallel to said scanning line, each of said units having means including a lens focussed substantially upon said line during its scanning interval for receiving through the input aperture of the respective scanning unit light rays travelling directly from said line and for forming said series of substantially parallel light rays at the output aperture of the respective scanning unit, whereby the light rays received by each scanning unit from said line pass through both said conveying member and the respective scanning unit, said optical element being positioned to receive directly from the output aperture of successive ones of said scanning units said series of substantially parallel light rays.

12. Apparatus according to claim 11 for scanning a multi-colored copy medium wherein one of said scanning units has color-discriminating means carried therewith for selectively passing through said one unit only light rays of substantially one color and wherein the next succeeding scanning unit on said member has color-discriminating means carried therewith for selectively passing through said next unit only light rays of substantially one color which is different from said first-mentioned color.

13. Apparatus according to claim 12 wherein each of said scanning units has mounted transversely adjacent thereto on said member a respective auxiliary scanning unit constructed substantially the same as said first-mentioned scanning unit but having no light color-discriminating means, each of said auxiliary units having a lens focussed substantially upon the scanning line during the scanning interval so as to scan simultaneously substantially the same incremental portions of said line as does its transversely adjacent unit which has color-discriminating means, a second optical element constructed substantially the same as said first-mentioned optical element and positioned to receive the light rays emerging from respective ones of said auxiliary scanning units during their respective scanning intervals and to direct said last-mentioned light rays into substantially parallel paths, and a second fixed light-sensitive device having a light-pickup surface whose dimensions are small in comparison with the length of the scanning line for receiving thereon said last-mentioned substantially parallel light rays.

14. In continuous optical scanning apparatus, means for advancing an elongated record medium in the direction of its length past a scanning station, means for projecting light onto the record medium at said station so that light rays leave said medium which are representative of the incremental recorded intelligence on said medium, means for repetitively scanning successive increments along an elongated elemental area corresponding to an elemental line of intelligence on said medium, said scanning means including an endless conveying member having carried thereon a plurality of scanning units which are spaced apart at substantially equal distances lengthwise of said member, said distances being correlated with the length of said elemental area, each of said units having light input and light output apertures, means for substantially shielding other portions of said units from undesired light rays during the respective scanning intervals of said units, means for advancing said member lengthwise in a direction substantially perpendicular to the direction of movement of the record medium past said station, a fixed light-sensitive device having a light-pickup surface the dimensions of which are small in comparison with the length of said elemental area, a fixed optical element having a narrow elongated portion for receiving a series of substantially parallel light rays from the output aperture of successive ones of said scanning units during their respective scanning intervals and for directing said substantially parallel rays onto said small pickup surface, means for substantially shielding extraneous light from said optical element and also from said light-pickup surface, each of said scanning units having means including optical means for receiving light rays from the record medium and for directing said last-mentioned light rays along a series of substantially parallel paths which are of a direction having a large and substantially constant angle with respect to the lengthwise direction of said elongated elemental area during the respective scanning intervals of said scanning units, whereby said last-mentioned light rays impinge upon the elongated portion of said optical element.

15. Apparatus according to claim 14 wherein said elongated portion of said optical element is an elongated segment of a smooth concave reflecting surface.

16. Apparatus according to claim 14 wherein said elongated portion of said optical element is an elongated reflecting surface contoured with the shape of at least part of a parabolic surface, and wherein each of said scanning units directs the light rays from the output aperture thereof into paths which are substantially parallel to the principal axis of the parabolic surface and which are also substantially perpendicular to said elongated elemental area, whereby the series of substantially parallel light rays impinging upon said reflecting surface are reflected therefrom to converge upon said pickup surface.

17. Apparatus according to claim 14 wherein each of said scanning units includes an input lens and an output lens and wherein each of said scanning units also includes an opaque partition with a small aperture therethrough spaced between said input lens and said output lens so that said input lens receives light rays from an elemental scanning spot on said elongated elemental area and converges said last-mentioned received rays substantially upon said small aperture which permits substantially only said last-mentioned received rays to pass therethrough, said output lens being focussed substantially on said small aperture to receive light rays having passed through said small aperture from said input lens and to redirect said received light rays into a set of output light rays from said scanning unit which are substantially collimated in a path substantially perpendicular to the direction of said elongated elemental area, whereby said substantially collimated output light rays are directed to impinge upon the elongated portion of said optical element.

References Cited in the file of this patent

UNITED STATES PATENTS

| | | |
|---|---|---|
| 2,216,716 | Withem | Oct. 1, 1940 |
| 2,296,274 | Finch | Sept. 22, 1942 |
| 2,355,369 | Finch | Aug. 8, 1944 |
| 2,415,051 | Thompson | Jan. 28, 1947 |
| 2,575,714 | Johnson et al. | Nov. 20, 1951 |
| 2,632,048 | Mason | Mar. 17, 1953 |
| 2,639,211 | Hallden et al. | May 19, 1953 |
| 2,776,337 | Thompson | Jan. 1, 1957 |
| 2,967,907 | Stamps | Jan. 10, 1961 |